(12) United States Patent
Wrolstad et al.

(10) Patent No.: US 6,180,154 B1
(45) Date of Patent: Jan. 30, 2001

(54) NATURAL COLORANT FROM POTATO EXTRACT

(75) Inventors: Ronald E. Wrolstad, Corvallis, OR (US); Luis E. Rodriguez-Saona, Alexandria, VA (US)

(73) Assignee: The State of Oregon acting by and through the State Board of Higher Education on behalf of Oregon State University, Corvallis, OR (US)

( * ) Notice: Under 35 U.S.C. 154(b), the term of this patent shall be extended for 0 days.

(21) Appl. No.: 09/301,417

(22) Filed: Apr. 28, 1999

(51) Int. Cl.$^7$ .............................. C09B 61/00; A23L 1/27
(52) U.S. Cl. .......................... 426/540; 426/655; 426/431
(58) Field of Search ................... 426/540, 655, 426/431, 425, 489; 8/438

(56) References Cited

U.S. PATENT DOCUMENTS

| | | | | |
|---|---|---|---|---|
| 5,947 | * | 12/1848 | Barrow | 426/540 |
| 15,361 | * | 7/1856 | Schmidt | 426/540 |
| 3,336,141 | * | 8/1967 | Frisina | 426/540 |
| 3,963,700 | * | 6/1976 | Philip | 426/425 |
| 4,083,779 | * | 4/1978 | Combe et al. | 426/495 |
| 4,105,675 | * | 8/1978 | Iacobucci et al. | 426/540 |
| 4,118,516 | * | 10/1978 | Van Praag et al. | 426/540 |
| 4,132,793 | * | 1/1979 | Haber et al. | 426/540 |
| 4,156,077 | * | 5/1979 | Pifferi | 536/4 |
| 4,172,902 | * | 10/1979 | Asen et al. | 426/250 |
| 4,211,577 | * | 7/1980 | Wallin et al. | 426/540 |
| 4,285,982 | * | 8/1981 | Iacobucci et al. | 426/250 |
| 4,302,200 | * | 11/1981 | Yokoyama et al. | 8/438 |
| 4,320,009 | | 3/1982 | Hilton et al. | |
| 4,336,244 | * | 6/1982 | Woznicki et al. | 426/250 |
| 4,366,173 | | 12/1982 | Parker | |
| 4,383,833 | * | 5/1983 | Hoffmann | 426/540 |
| 4,452,822 | | 6/1984 | Shrikhande | |
| 4,481,226 | * | 11/1984 | Crosby et al. | 426/540 |
| 4,500,556 | * | 2/1985 | Langston | 426/540 |
| 5,013,565 | | 5/1991 | St. Martin et al. | |
| 5,908,650 | * | 6/1999 | Lenoble et al. | 426/540 |

FOREIGN PATENT DOCUMENTS

| | | | |
|---|---|---|---|
| 8302342 | * | 12/1984 | (BR) . |
| 2298558 | | 12/1990 | (JP) . |
| 3-41167 | * | 2/1991 | (JP) . |
| 3041167 | | 2/1991 | (JP) . |
| 6-65517 | * | 3/1994 | (JP) . |
| 8-23919 | * | 1/1996 | (JP) . |
| 10-204312 | * | 8/1998 | (JP) . |
| 10204312 | | 8/1998 | (JP) . |
| 10-279825 | * | 10/1998 | (JP) . |

OTHER PUBLICATIONS

Brouillar, *The in vivo expression of anthocyanin colour in plants*, Phytochemistry, 22(6):1311–1323 (1983).

(List continued on next page.)

*Primary Examiner*—Cynthia L. Nessler
(74) *Attorney, Agent, or Firm*—Klarquist Sparkman Campbell Leigh & Whinston, LLP

(57) ABSTRACT

A natural, red-hue colorant that is substantially free of alkaloids and polyphenoloxidase, has good stability, minimal aroma, and does not contain any organic solvent residuals is provided. The natural colorant has a red-hue equivalent to the red-hue of FD&C Red No. 40 and is more stable as compared to existing natural colorants. Methods for extracting anthocyanin pigments from red-fleshed potatoes without use of an organic solvent, while essentially eliminating alkaloids and polyphenoloxidase from the extract are also provided. Potatoes are pressed and filtered and the filtrate (i.e., potato juice containing potato anthocyanin pigments) is concentrated. The pH of the concentrate is adjusted with alkali to precipitate alkaloids therein. The concentrate is filtered and the pH of the filtrate is adjusted to a pH value of about 3.5 or lower. The pH is adjusted in such a manner to obtain a colorant having the desired red-hue color and intensity (i.e., a natural colorant having a red-hue equivalent to FD&C Red No. 40).

20 Claims, 2 Drawing Sheets

OTHER PUBLICATIONS

Friedman et al., *Distribution of glycoalkaloids in potato plants and commercial potato products*, J. Agric. Food Chem., 40:419–423 (1992).

Harbone, Plant ployphenols: 1. *Anthocyanin production in the cultivated potato*, Biochem. J., 74:262–269 (1960).

Hong et al., *Use of HPLC sepration/photodiode array detection for characterization of anthocyanins*, J. Agric. Food Chem., 38:708–715 (1990).

Nagels et al., *High–Performance liquid chromatographic separtion of naturally occuring esters of phenolic acids*, J. Chrom., 187:181–187 (1980).

Roddick et al., Synergistic interaction between the potato glycoalkaloids $_\alpha$–solanine and $_\alpha$–chaconine in relation to lysis of phospholipid/sterol liposomes, Phytochemiisty, 26(5):1325–1328 (1987).

Roddick et al., *Membrane–disrupting properties of the steroidal glycoalkalodis solasonine and solamargine*, Phytochemistry, 29(5):1513–1518 (1990).

Shih et al., α *and* β–*solamarine in kennebec solanum tuberosum leaves and aged tuber slices*, Phytochemistry, 13:997–1000 (1974).

Stanker et al., *Development and characterization of monoclonal antibodies that differentiate between potato and tomato glycoalkaloids and aglycons*, J. Agric. Food Chem., 42:2360–2366 (1994).

Van Gelder et al., *Characterization of novel steroidal alkalods from tubers of solanum species by combined gas chromatography–mass spectrometry*, J. Chrom., 482:13–22 (1989).

Francis, F.J., *Food colorants: anthocyanins*, Crit. Rev. Food Sci. and Nutr. (4):273–314 (1989).

Friedman, M. and McDonald, G.M., *Extraction Efficiency of various solvents for glycoalkaloid determination in potatoes and potato products*, Am. Potato J. 72:621 (1995).

Friedman, M. and McDonald, G.M., *Potato glycoalkaloids: chemistry, anlysis, safety, and plant physiology*, Crit. Rev. Plant Sci. 16(1):55–132 (1997).

Giusti, M.M. and Wrolstad, R.E., *Characterization of red radish anthocyanins*, J. Food Sci. 61(2):322–326 (1996).

Hall, R.L., *Toxicological burdens and the shifting burden of toxicology*, Food Technol. 46(3):109–112 (1992).

Harborne, J.B., *Plant polyphenols: 1. anthocyanin productin in the cultivated potato*, Biochem. J. 74:262–269 (1960).

Habib, A.T. and Brown, H.D. *The effect of oxygen and hydrogen–ion concentration on color changes in processed beets, strawberries and raspberries*, Proc. Am. Soc. Hort. Sci. 68:482–490 (1956).

Hosokawa, K., Fukunaga, Y., Fukushi, E. and Kawabata, J., *Acylated anthocyanins from red Hyacinthus orientalis*, Phytochem. 39 (6):1437–1441 (1995).

Jackman, R.L. and Smith, J.L., *Anthocyanins and betalains*, In Natural Food Colorants. First Edition. G.A.F. Hendry and J.D. Houghton Eds. Chapman and Hall, New York, USA (1992).

Jadhav, S.J., Sharma, R.D. and Salunkhe, D.K., *Naturrally occurring toxic alkaloids in food*, Crit. Rev. Toxicol. 9:21–104 (1981).

Kozukue, N., Kozukue, E. and Mizuno, S., *Glycoalkaloids in potato plants and tubers*, HortScience 22(2):294–296 (1987).

Lewis, C.E. Biochemistry and regulation of anthocyanin synthesis in potato and other tuberbearing solanum species. Ph. D. Thesis. Department of plant and Plant micorobial Science, University of Canterbury, Christchurch, New Zealand (1996).

Morris, S.C. and Lee, T.H., *The toxicity and teratogenicity of Solanaceae glycoalkaloids, Particularly those of the potato (Solanum Tuberosum*: a review, Food Technol. Australia 36(3):118–124 (1984).

Morris, S.C. and Petermann, J.B, *Genetic and environmental effects on levels of glycoalkaloids in cultivars of potato (Solanum Tuberosum)*, Food Chem. 18:271–282 (1985).

Rodriguez–Saona, L.E., Giusti, M.M. and Wrolstad, R.E., *Anthocyanin pigment composition of red–fleshed potatoes (Salanum tuberosum and Solanum stenotomum)*, J. Food Sci., 63(3):458–465 (1998).

Sachse, J., *Anthocyane in den kartoffelsorten Urgenta und Desiree (Solanum Tuberosum L.)*, Z. Lebensm. Unters.–Forsch. 153:294–300 (1973).

Salunkhe, D.K. and Wu, M.T., *Control of postharvest glycoalkaloids formation in potato tubers*, J. Food Prot. 42(6):519–525 (1979).

Schreiber, K., *Steroid alkaloids: The Solanum group. In The alkaloids chemistry and physiology*, vol. X, Eds Manski, R.H.F. Academic Press, NY pp. 1–192 (1968).

Tingey, W.M. *Glycoalkaloids as pest resistance factors*, Am. Potato J. 61:268–167 (1984).

Valkonen, J., Keskitalo, M., Vasara, T. and Pitila, L., *Potato glycoalkaloids: a burden or a blessing ?*, Crit. Rev. Plant Sci. 15(1):1–20 (1996).

Van Gelder, W.M.J., *Chemistry, toxicology, and occurrence of steroidal glycoalkaloids: poitential contaminants of the potato (Solanum tuberosum L.), in Ooisonous plant contamination of edible plants*. Eds Abbel–Fattah M. Rizk. CRC Press, Boca Raton, FL pp. 117–156 (1991).

Wrolstad, R.E., *Color and pigment anayses in fruit products*, Oregon St. Univ. Agric. Exp. Stn. Bulletin 624 (1976).

Wrolstad, R.E., Culbertson, J.D., Cornwell, C. and Mattick, L.R., *Detection of adulteration in blackberry juice concentration and wines*, J. Assoc. Off. Anal. Chem. 65(6):1417–1423 (1982).

Wrolstad, R.E. *Colorants, In Food chemistry: principles and applicationsm*, Eds. G.L. Christen and J.S. Smith, Science and Technology System, West Sacramento, CA. In press (1997).

Wünsch, A. and Munzert, M., *Effect of storage and cultivar on the distribution of glycoalkaloids in potato tuber*, Potato Res. 37:3–10 (1994).

Uppal, D. S., *Varietal and environmental effect on the glycoalkaloid content of potato (Solanum Tuberosum L.*, Plant Foods Hum. Nutr. 37:333–340 (1987).

Rodriguez–Saona, L.E., Wrolstad, R.E. and Pereira, C., *Glycoalkalopid Content and Anthocyanin Stability to Alkaline Treatment of Red–Fleshed Potato Extracts*, J. Food Sci., 64:445–450 (May 1999).

Rodriguez–Saona, L.E. Giusti, M.M. and Wrolstad, R.E., *Color or Pigment Stability of Red Radish and Red–Fleshed Potato Anthocyanins in Juice Model Systems*, J. Food Sci., 64:451–456 (May 1999).

Rodriguez–Saona, L.E., *The Potato: Composition, Non–Enzymatic Browning and Anthocyanins*, Ph.D. Thesis Abstract and Table of Contents (Jun. 4, 1998).

Bömer, A. and Mattis, H., *Der Solaningehalt der Kartoffeln.*, Z. Unters. Nahr. Genussmittel, 47:97–127 (1924).

Wünsch, A. Munzet, M., *Effect of storage and cultivar on the distribution of glycoalkaloids in potato tuber*, Potato Res., 37:3–10, 1994.

* cited by examiner

■ Sodium Phosphate Tribasic: 87.1 - 7.6(pH)
● Potassium Hydroxide: 74.0 - 6.2(pH)

NATURAL COLORANT FROM POTATO EXTRACT

FIELD OF THE INVENTION

The present invention pertains to a natural red colorant for use as an additive to foodstuffs, beverages, pharmaceuticals, toiletries, and the like.

BACKGROUND AND SUMMARY OF THE INVENTION

Colorants in foods are either natural pigments or synthetic compounds. There is a need for natural red-hue colorants that can serve as an alternative to the existing red-hue colorants, such as, FD&C Red No. 40, for use as an additive to foodstuffs, beverages, pharmaceuticals, toiletries, and the like. Various colorants have been produced by extraction of various fruits and vegetables. For example, in U.S. Pat. Nos. 4,452,822 and 4,500,556, anthocyanins are extracted from grape pomace to produce a colorant. However, such colorant extracts include residual organic compound residues due to the manner of extraction and do not possess a red-hue equivalent to FD&C Red No. 40.

Red cabbage and purple carrots have also been extracted to obtain natural colorants. Both the red cabbage and purple carrot extracts, however, do not provide a red-hue colorant equivalent to the red hue of FD&C Red No. 40. Anthocyanins have also been extracted from radishes to provide a red-hue colorant. However, the radish extracts possess a relatively strong and unpleasant flavor (and odor) due to the presence of glucosinolate break-down products, making the radish colorant undesirable for foodstuffs and beverages.

There has been some (unsuccessful) research regarding the use of various potato extracts as a source for natural colorants. Some of the research has been directed to potato cultivars rich in anthocyanin pigments, but the extract is of a purple hue rather than a red hue.

Natural fruit and vegetable juices have been approved by the FDA as colorants as long as a physical separation or extraction of the colorants is performed. That is, chemical separation means cannot be used to separate the colorants, only physical separation processes, such as by dehydration, concentration, and membrane-separation technology. Aqueous fruit and vegetable extractions are also considered physical separations of the colorant. Thus, it is relatively easy and inexpensive to obtain FDA approval for such "natural colorants."

It may be possible to prepare a relatively stable, red-potato anthocyanin extract by absorption of potato extract on a C-18 silica resin. Such extractions, however, have not previously been performed because subsequent extraction with an acidic alcohol is necessary. The Food and Drug Administration (FDA) has very strict standards and requirements for approval of such a colorant extract for use as food colorants because organic solvents are used for the extraction process (i.e., a chemical separation process is used). The organic solvent extraction typically leaves residual amounts of the organic solvent in the extract. Accordingly, if such a chemical separation process is used, the FDA requires extensive and costly toxicological and safety tests be performed before such a colorant could be considered and possibly approved by the FDA. Even then, it may not be possible to sufficiently remove the organic solvent residuals from the extract such that the extract could be used as a food colorant.

Potato anthocyanins have not been used as colorants because potatoes, both cultivated and wild potatoes, contain steroidal glycoalkaloids. Specifically, steroidal glycoalkaloids ("SGAs" or "alkaloids"), a class of nitrogen containing compounds that possess the $C_{27}$ skeleton of cholestane, are present in cultivated and wild potatoes. The major alkaloids in commercial potatoes are α-solanine and α-chaconine, which are glycosylated derivatives of the aglycone solanidine. Potato breeding typically introduces desired traits (e.g., frost, disease, and pest resistance) but tends to result in increased concentrations of such alkaloids. Alkaloids are natural toxins in potatoes that probably evolved as protective compounds in response to tissue invasion. Alkaloids have antimicrobial, insecticidal, and fungicidal properties that provide resistance against several insect pests and herbivores. Roddick et al., *Membrane Disrupting Properties of the Steroidal Glycoalkaloids Solasonine and Solamargine,* Phytochemistry, Vol. 29, pp. 1513–1518 (1990); Tingey, *Clycoalkaloids as Pest Resistance Factors,* Am. Potato Journal, Vol. 61, pp. 157–167 (1984); Schreiber, *Steroid Alkaloids: the Solanum Group,* R.H.F. Academic Press, N.Y., pp. 1–192 (1968). However, alkaloids possess pharmacological and toxicological effects that are harmful to human beings. Van Gelder, *Chemistry, Toxicology and Occurrence of Steroidal Glycoalkoloids: Potential Contaminants of the Potato,* Eds. Abbel-Fattah and Rizk, CRC Press, FL, pp. 117–156 (1991); Jadhav et al., *Naturally Occurring Toxic Alkaloids in Food,* Crit. Rev. Toxicol., Vol. 9, pp. 21–104 (1981). Alkaloids along with cyanogenic glucosinolates are responsible for more human illnesses and deaths than any other plant toxicants. Hall, *Toxicological Burdens and the Shifting Burden of Toxicology,* Food Technol., Vol. 46, pp. 109–112, (1992).

A safety level for acceptable alkaloid concentrations in potatoes was established at 200 mg/kg for acute toxicity, but these levels do not account for possible subacute or chronic effects. An upper limit of 60 mg/kg to 70 mg/kg has been proposed for potato cultivars selected for human consumption. Valkonen et al., *Potato Glycoalkaloids: A Burden or a Blessing?,* Crit. Rev. Plant Sci., Vol. 15(1), pp. 1–20, (1996); Van Gelder, *Chemistry, Toxicology and Occurrence of Steroidal Glycoalkoloids: Potential Contaminants of the Potato,* Eds. Abbel-Fattah and Rizk, CRC Press, FL, pp. 117–156 (1991).

The FDA requires that the concentration of alkaloids in potato cultivars be below a particular level before the potato is approved for human consumption. The FDA also requires documentation of the alkaloid concentration of newly developed cultivars. A problem in extracting anthocyanin from potatoes is that the anthocyanin extract of the potatoes also contains such alkaloids. Accordingly, potato extracts have not heretofore been developed for use as red-hue colorants.

The alkaloid concentrations in red-fleshed potato anthocyanin extracts are of concern since they tend to be concentrated along with the anthocyanin pigments. Alkaloids are fairly heat-stable compounds, slightly affected by steaming, boiling, baking, frying, cooking and microwaving of potatoes. Friedman et al., *Potato Clycoalkaloids: Chemistry, Analysis, Safety, and Plant Physiology,* Crit. Rev. Plant Sci., Vol. 16(1), pp.55–132, (1997); Van Gelder, *Chemistry, Toxicology and Occurrence of Steroidal Glycoalkoloids: Potential Contaminants of the Potato,* Eds. Abbel-Fattah amd Rizk, CRC Press, FL, pp. 117–156 (1991). Alkaloids will precipitate under basic conditions. The stability of the anthocyanins, however, is affected by basic pH. A basic pH increases the rate of degradation of the anthocyanin pigments, and hence any colorant formed by the same. Wrolstad, *Colorants in Food Chemistry: Principles and Applications,* Ed. Christen, G. L., AFNC Press, CA (1999); Francis, *Food Colorants: Anthocyanins*, Crit. Rev. Food Sci. and Nutr., Vol. 28(4), pp. 273–314 (1989); Harib et al., *The Effect of Oxygen and Hydrogen Ion Concentration on Color Changes in Processed Beets, Strawberries and Raspberries*, Proc. Am. Soc. Hort. Sci., Vol. 68, p. 482 (1956).

Further, potatoes contain polyphenoloxidase (PPO) which also presents a problem when extracting anthocyanin pigments from potatoes for use as colorants. That is, the extract would likely contain such PPO. PPO, polymerized phenolics, react with anthocyanin pigments, accelerating degradation of the anthocyanin colorant to produce an undesirable browning of the extract.

The present invention provides a natural, red-hue colorant compositions that are substantially free of alkaloids and PPO, has good stability, minimal aroma, minimal taste, and does not contain any organic solvent residuals. The natural colorant compositions further provide a red-hue equivalent to the red-hue of FD&C Red No. 40 and are more stable than existing red-hue natural colorants. The natural colorant compositions also provide a semi-purified alkaloid fraction. Such purified alkaloid fraction may be used as a natural pesticide, herbicide, antimicrobial agent, insecticide, or fungicide.

Further, the present invention provides methods for preparing colorant compositions comprising anthocyanin pigments extracted from red-fleshed potatoes without use of an organic solvent, while essentially eliminating alkaloids and PPO from the extract. The disclosed methods of the present invention provide production of natural colorant compositions having a red-hue equivalent to FD&C Red No. 40. Moreover, the disclosed natural colorant compositions and methods of making the same, meet FDA classification parameters as a colorant exempt from severe certification requirements (i.e., the process is a "physical separation" rather than a "chemical separation"). The disclosed method and corresponding natural colorants fall within the group of natural vegetable juices that are already approved by the FDA.

Specifically, in a method of the present invention, potato slices are pressed and filtered. The filtrate (i.e., potato juice containing potato anthocyanin pigments) is then concentrated and the pH of the concentrate is adjusted with alkali to precipitate alkaloids. Adjustment of the pH of an anthocyanin extract has not before been considered appropriate because alkali saponifies the acylated anthocyanins. Additionally, such a pH adjustment of an anthocyanin extract typically accelerates the degradation of the anthocyanin. In the present methods, however, the conditions for pH adjustment have been optimized to maximize the precipitation of unacceptable alkaloids while minimizing saponification and degradation of the anthocyanin pigments.

After the alkaloids are precipitated, the concentrate is filtered and the pH of the filtrate is adjusted to a relatively low pH value. The pH is adjusted in such a manner to obtain a colorant having the desired red-hue color and intensity (i.e., a natural colorant having a red-hue equivalent to FD&C Red No. 40). Additionally, acid adjustment of the filtrate to a relatively low pH value improves the stability of the anthocyanin pigments.

The foregoing and other features and advantages of the present invention will become more apparent from the following detailed description, drawings, and examples of the red-hue natural colorant compositions and methods for making the same.

DETAILED DESCRIPTION

The present invention provides a natural, red-hue colorant that is substantially or completely free of alkaloids, polyphenoloxidase, and glucosinolate break-down products. The disclosed natural colorant also has good stability, minimal aroma, minimal or no taste, and does not contain any organic solvent residuals. The disclosed natural colorant has a red-hue equivalent to the red-hue of FD&C Red No. 40 and is more stable than most existing natural colorants.

As defined herein, a "natural colorant" is a colorant suitable for food and beverage applications, is derived solely from natural pigments, contains no synthetic dyes, lakes or residual organic solvents, and is obtained by use of physical separation processes. Also as defined herein, a red-hue colorant equivalent to FD&C Red No. 40 is a colorant that has about the same color parameters as FD&C Red No. 40 (but not necessarily at the same colorant concentration levels). The color parameters of FD&C Red No. 40 vary with the concentration of the Red No. 40 solution. At a concentration of 1.5 mg/100 mL of FD&C Red No. 40, the color characteristics are as follows: lightness value ($L^*$) is equal to about 67, chroma is equal to about 65, and a hue angle of about 38 degrees. As used herein, a pH value below 7 is acidic, a pH of 7 is neutral, and a pH over 7 is alkaline or basic.

Figure 1:
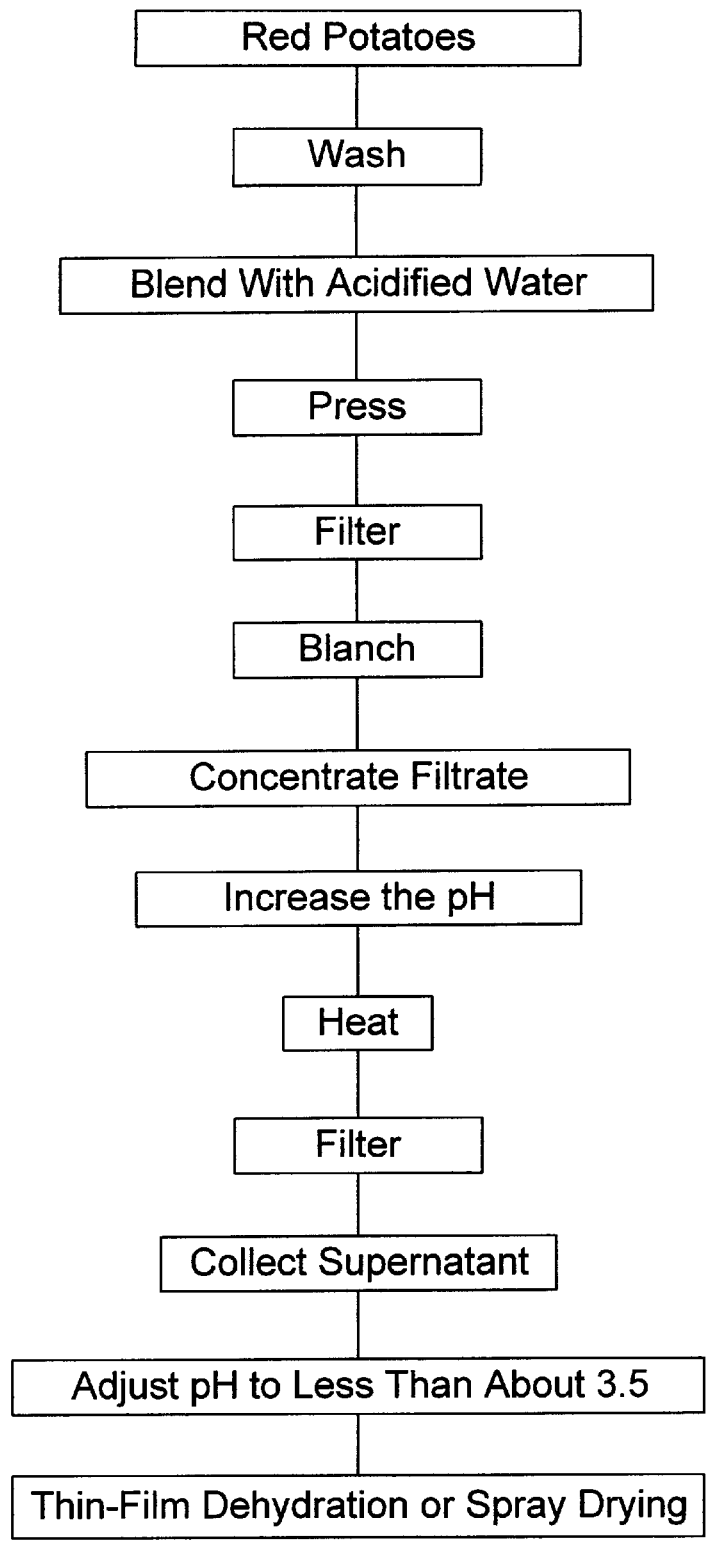
FIG. 1 is a process flow chart of a method of the present invention.

As shown in the process flow chart of FIG. 1, a method of the present invention provides the natural, red-hue colorant of the present invention, through extraction of red-fleshed potatoes. Although any red-fleshed potato may be used to practice the method of the present invention, the following types of potato cultivars have been determined to be useful in practicing the methods of the present invention: NDC4069-4, ND5538-2, ND5849-1, 6236-1, 6236-2, 4239, NDOP5847-1, NDOP5847-2, NDOP5849-3, NDOP5589-1, NDOP5589-2, NDOP5538-1, NDOP5538-2, NDOP 5538-3, NDOP5538-4, NDOP5538-5, NDOP5538-6, NDOP5538-7, NDOP5538-8, NDOP5538-9, NDOP5538-10, NDOP5538-11, NDOP5538-12, NDOP5538-13, ND3261-5R, Huckleberry, All Red, Blossom, Levitts Pink, Cherry Jubilee, Wayru, Leque chaki, and Pokko lomocho potato cultivars. The concentration of glycoalkaloids in red-flesh potatoes vary among potato cultivars. Those cultivars with the highest levels of anthocyanin pigment typically have lower glycoalkaloid content, making such cultivars preferable for use as extract sources for the present natural colorant compositions. Potato clones NDOP5847-1 and NDC4069-4 have relatively high anthocyanin concentrations (typically about 40mg/100 g tuber).

Suitable fresh potato cultivars are washed with cold water to eliminate extraneous matter. The potatoes may be refrigerated at from about 5° C. to about 10° C. until they are to be extracted or may be extracted immediately following the wash. Low temperature storage of the potatoes (i.e., less than about 10° C.) helps to control sprout growth, reduces senescent sweetening, and minimizes storage diseases. Storage at temperatures less than about 5° C. may cause undesirable accumulation of sugars through the hydrolysis of starch. Accumulation of sugars will limit the anthocyanin concentration process.

Although it may be less efficient to attempt to extract a whole potato, a whole potato may be used if it can be blended by a blender or the like. If the potato is cut into smaller pieces for extraction, the pieces are preferably placed in acidified water to prevent enzymatic browning. The potato pieces are contacted by acidified water to "inactivate" or "retard" polyphenoloxidase present in the potatoes. Inactivation of the polyphenoloxidase avoids browning of the extract (i.e., the potato juice) and provides better pigment colorant stability. As defined herein, inactivation of the polyphenoloxidase refers to the minimalizing of browning reactions and pigment degradation due to the polyphenoloxidase.

The acidified water is preferably at a pH value of less than 4.5 and more preferably less than 3.5. Good results have been obtained when the acidified water had a pH value of about 3.0. Acidified water having higher pH values (e.g., equal to or above about 4.5) tends to cause degradation of the potato anthocyanin pigment. The water may be acidified using any suitable acid as known to those persons skilled in the art. For example, phosphoric acid or hydrochloric acid may be used to acidify the water. For example, good results are obtained when potato slices are blended in a 0.3 $NH_3PO_4$ solution at a 1/1 wt/vol ratio. The acidified water should have the buffering capacity to prevent changes in pH value of the potato/acidified water solution. Red-fleshed potatoes typically have a pH value of about 6.0, which increases the pH of the solution if the solution is not sufficiently buffered. The resulting browning reactions tend to destroy the monomeric anthocyanins present.

Following contact with the acidified water, the potato pieces (or blended potato) are pressed using a conventional juice hydraulic press. The potato juice pressed from the potatoes is then filtered using conventional filtering techniques, such as diatomeceous earth filtration. The filtrate (i.e., the filtered potato juice) is then blanched, preferably at about 93° C. (200° F.) for about 10 minutes. As known to those persons skilled in the art, a range of temperatures and times may be used to blanch the filtrate. The filtrate may be blanched by hot water or steam-direct scalding treatment or any other suitable technique as known to persons skilled in the art. Blanching the filtrate inactivates any residual polyphenoloxidase and precipitates proteins and colloidal matter present in the filtrate.

The blanched filtrate is again filtered to remove precipitants and is also, preferably centrifuged. The second filtration and centrifugation removes the precipitated proteins and colloidal matter to provide a filtrate free of any polyphenoloxidase. The blanched filtrate still, however, contains undesirable alkaloids along with the desired anthocyanin pigments.

Following filtration, the filtrate is examined for the presence of any remaining starch. Most, if not all, of the starch present in the filtrate is preferably removed therefrom. During the alkaloid precipitation process (discussed below) the concentrated extract is heated under alkaline condition. Heating under alkaline conditions causes gelatinization of residual starch. As a result, a gel will form upon cooling. Accordingly, preferably most (if not all) of the starch is removed from the filtrate using means known to those persons skilled in the art.

The resulting filtrate is then concentrated by conventional technique. Concentration by thermal evaporation under vacuum conditions using a Alfa-Laval CENTRITHERM™ concentrator has been found to be effective. However, the filtrate may be concentrated by any number of methods as known to those persons skilled in the art. The concentration of the filtrate should not be at temperatures that are so high, or for periods of time that are so long, that degradation of the anthocyanin pigments takes place. Time and temperature conditions for concentration of an extract are variable depending upon the equipment and the technology used for the concentration process. Use of a CENTRITHERMTM concentrator at a temperature range of from about 50° C. to about 60° C. with a residence time of about 10 to 20 minutes has been found to be effective. Concentration of the filtrate increases the concentration of the alkaloids in solution, which improves later precipitation of the same. Further, concentrated levels of anthocyanins typically have a stabilizing effect on the anthocyanin pigments, likely due to intermolecular co-pigmentation.

As stated above, adjustment of the concentrate to a basic pH value has not heretofore been practiced to obtain a natural colorant from a potato extract. Such alkaline pH adjustment of an anthocyanin extract has been avoided in the past because alkali is known to saponify the acylated anthocyanins and accelerate degradation of the anthocyanins, such that the anthocyanin pigment extract would no longer be suitable as a colorant. In the method of the present invention, however, the conditions for the pH adjustment of the concentrate have been optimized to maximize alkaloid precipitation while minimizing the anthocyanin saponification and degradation, thereby providing a colorant having a red-hue equivalent to FD&C Red No. 40, without the presence of a significant amount of alkaloid.

Specifically, the pH of the concentrate is carefully adjusted with alkali to precipitate alkaloids therein but to avoid degradation of the anthocyanin pigments. The pH is adjusted to a value of from about 7.6 to about 9.0. If the pH value of the concentrate is adjusted to a pH value that is too high, there is significant degradation of the anthocyanin pigment (and, hence, of the eventual colorant obtained). At a pH value of greater than about 9.0, there is about a 60% to about a 80% loss in anthocyanin pigmentation (i.e., a 60% to 80% decrease in monomeric anthocyanin pigment concentration or destruction of the pg-3-rut-5-glu acylated with p-coumaric acid). At a pH value of about 9.5 or greater, there is severe anthocyanin pigment degradation, resulting in up to 90% destruction of the monomeric anthocyanin pigment concentration (i.e., pg-3-rut-5-glu acylated with p-coumaric acid).

Figure 2:
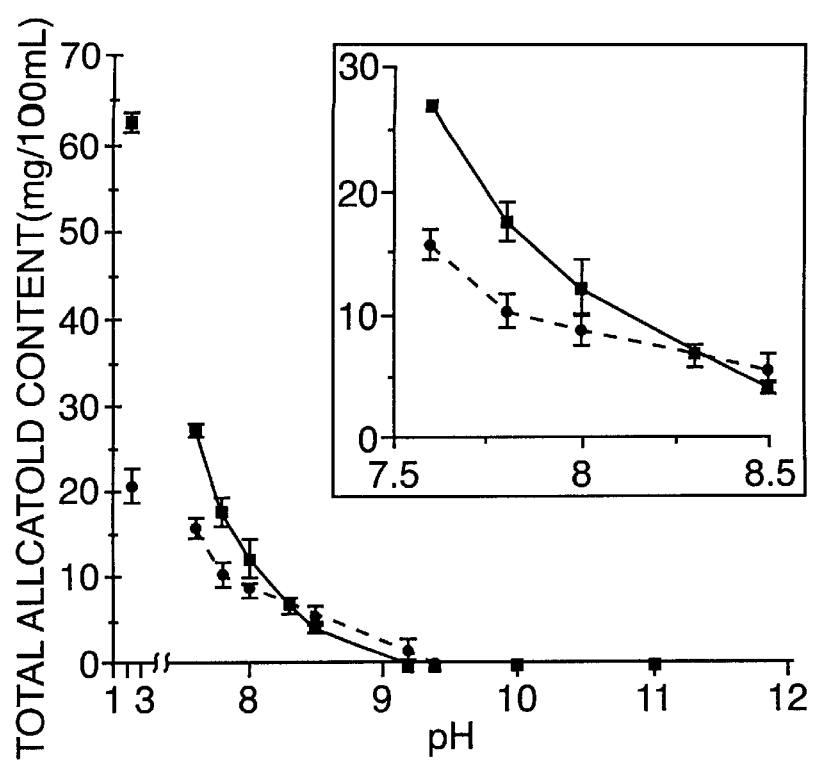
FIG. 2 is a graphical illustration of the precipitation of glycoalkaloids in anthocyanin containing red-fleshed potato extracts, due to alkaline treatment.
Figure 3:
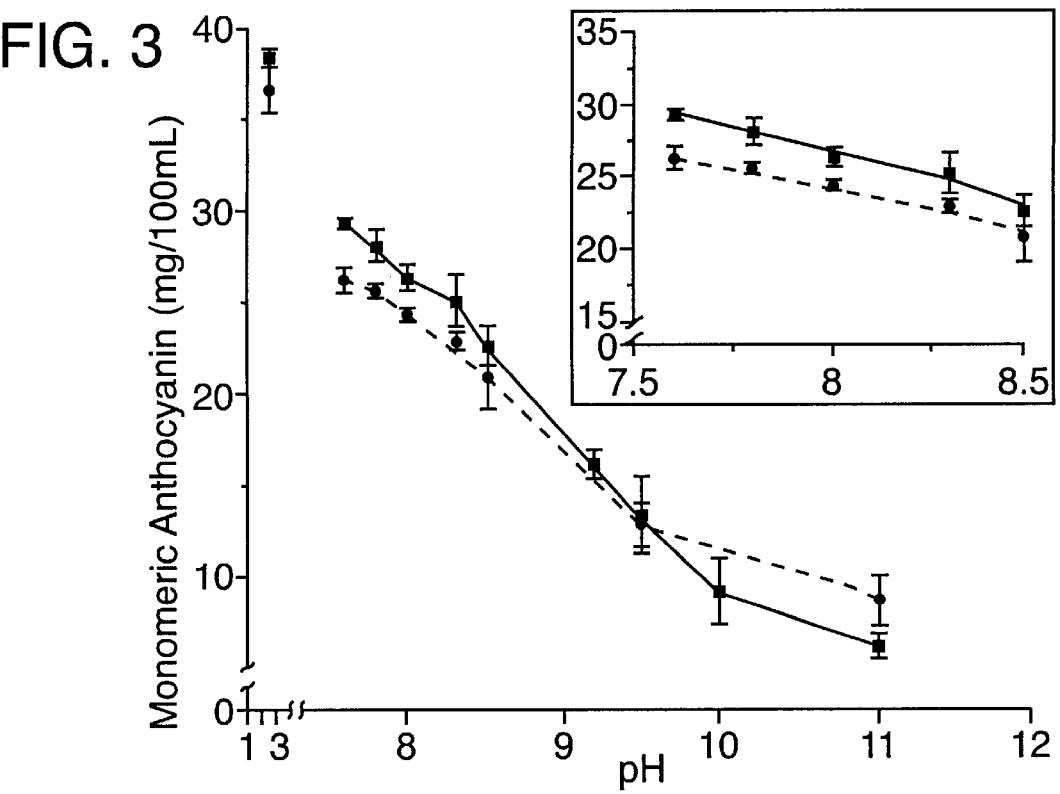
FIG. 3 is a graphical illustration of the effect of alkaline treatment (using different alkaline agents) on the monomeric anthocyanin content of red-fleshed potato extracts.

If the pH value is too low, however, the alkaloids are not sufficiently precipitated. For example, an adjustment to a pH value of about 6 will not result in any significant amount of alkaloid precipitation, while adjustment to a pH value of 7.5 or less typically does not result in a sufficient amount of alkaloid precipitation. The alkaloid content of the resulting colorant must be sufficiently low to meet FDA restrictions. Adjustment to a pH value of about 8.0 has been found to be especially useful. Adjustment of the pH to a value of about 8.0 typically causes precipitation of about 90% of the alkaloids without significant anthocyanin degradation or changes in the pigment profile. FIG. 2 illustrates the effect of alkaline treatment on the precipitation of glycoalkaloids in the concentrate. (FIG. 2 does not include fitted regression lines). FIG. 3 illustrates the anthocyanin concentrations of the concentrate at different pH levels.

The pH of the concentrate may be adjusted with any of a variety of alkaline compounds, e.g., ammonium hydroxide, potassium phosphate, potassium hydroxide, sodium hydroxide, and mixtures thereof. Potassium hydroxide and potassium phosphate have proved to be especially useful because these compounds tend to result in an overall lower level of pigment degradation. Use of potassium hydroxide to adjust the pH is relatively fast, requires less alkali, and does not tend to precipitate after further concentration. Furthermore, use of potassium phosphate (e.g., $K_3PO_4.12H_2O$) tends to cause an overall pigment degradation as compared to potassium hydroxide treatment.

The pH-adjusted concentrate is heated to a temperature of from about 40° C. to about 50° C., using conventional techniques known to persons skilled in the art. The concentrate may be heated during alkali adjustment of the pH or after such adjustment. Heating of the pH adjusted concentrate aides in the precipitation of the alkaloids. Favorable results have been obtained by heating the pH-adjusted filtrate to a temperature of from about 40° C. to about 50° C. for about 10 to about 15 minutes. The precipitated alkaloids are then removed from the alkali pH-adjusted concentrate by conventional technique, such as centrifugation or direct osmotic concentration. Centrifugation of the alkali pH-adjusted extract at about 10,000 RPM for from about 10 to about 20 minutes has been found to be effective to separate the precipitated alkaloid from the concentrate. Direct osmotic concentration of the alkali pH-adjusted concentrate provides the advantage of removing salt formed during alkali adjustment of the pH of the concentrate. The anthocyanin pigment supernatant is then collected.

Anthocyanin pigment extracts undergo color changes with changes in the pH value. Anthocyanin extracts tend to be a more intense red color (i.e., flavilium form) and are more stable under acidic conditions (i.e., at a pH value of less than or equal to about 3.5). At higher pH values of the anthocyanin extract, the anthocyanin extract fades (i.e., decreases in intensity) at a pH of about 4.5 to about 5.5. At a pH value of about 6 or greater, the anthocyanin extract changes to a purple or blue hue (i.e., quinonoidal base form).

Accordingly, the pH value of the potato anthocyanin supernatant is subsequently adjusted to a pH of from about 1 to about 4.0. Preferably, the pH value of the supernatant is adjusted to from about 2.5 to about 3.5. Adjusting the supernatant to a pH value less than about 2.5 results in a colorant that is typically too acidic for most applications. On the other hand, adjustment of the pH of the anthocyanin supernatant to a value of about 4 or greater results in a colorant that may have a sufficient red hue (i.e., a red hue equivalent to that of FD&C Red No. 40) but typically does not display the desired intensity or lightness. Good results have been obtained by adjusting the pH value of the anthocyanin supernatant to from about 3 to about 3.5, with a pH value of 3.5 resulting in a colorant of excellent red hue and intensity. For example, colorant compositions having superior red hue and intensity have been obtained when the anthocyanin supernatant is collected and immediately acidified with, e.g., phosphoric acid (food grade) to a pH value of about 3.0. Ultimately, the pH is adjusted in such a manner as to obtain a colorant having a red-hue and intensity equivalent to FD&C Red No. 40. If a dry colorant concentrate is desired, the anthocyanin supernatant may be dried after the pH is adjusted to the appropriate acidic pH value, by spray drying or by thin-film dehydration.

An especially useful natural, potato colorant composition obtained using the present methods comprise about 250 mg/100 mL anthocyanin pigment (i.e., pelargonidin 3-rutinoside-5-glucoside acylated with p-coumaric acid), about 60 to about 125 mg/100 mL phenolics (about 60–85% of the phenolic acids being chlorogenic acid and its isomers and p-coumaric acid, caffeic acid, and ferulic acid being present), and about 37 g/100 mL sugar (i.e., sucrose, glucose, and fructose).

The colorant composition may have a pH value of about 2.4 and has less than about 5 mg/100 mL alkaloids.

The color parameters of the colorant compositions vary with the concentration of the colorant composition and the pH value of the composition. However, model juices (pH of about 3.5), colored with the potato extract colorant compositions typically have a hue angle ranging from about 18° to about 30° at levels of about 15 mg/100 mL and 45 mg/100 mL, respectively. The hue angle of the natural colorant compositions disclosed herein typically exceed 40° at a pH value of about 1, decrease to about 32° at a pH value of about 2, and decrease to about 20° at a pH value of about 3. At pH values of about 4 to about 7, the hue angle of the colorant composition remains at about 20°. The intensity of the colorant composition, however, drops dramatically at pH values of about 4 to about 7. See Table 1 for the color parameters of a natural colorant composition as disclosed herein.

TABLE 1

| Sample | Concentration (mg/100 mL) | L* | Chroma | Hue (degrees) | Haze |
|---|---|---|---|---|---|
| Red Potatoes | 15 | 79.2 | 26.7 | 17.3 | 1.14 |
| | 30 | 64.4 | 48.1 | 21.4 | 1.05 |
| | 45 | 53.8 | 63.1 | 29.5 | 1.14 |
| FD&C Red No. 40 | 1.5 | 63.5 | 71.2 | 32.2 | 1.2 |

EXAMPLES

Anthocyanin Extracts

Red-fleshed potato tuber (cv NDC4069-4) anthocyanins were extracted using both chemical purification and juice processing operations. Chemical purification was done by the acetone/chloroform procedure described by Giusti and Wrolstad (1996). Pigments were partially purified using a C-18 resin, mini-column (high load C-18 resin tube), having a 20 mL capacity and a 5 g sorbent weight (as available from Alltech Assoc., Inc., IL). The purified fractions were labeled potato anthocyanin extract (POT). Potato juice concentrate was produced by blending potato tubers with acidified water (0.5 M citric acid) and were concentrated using a Buchi rotovapor at about 40° C. The potato juice was blanched at about 100° C. for about 5 min, and concentrated. The concentrated juice was treated with $K_3PO_4.12H_2O$ to precipitate the alkaloids.

Preparation and Storage of Potato Juice

A 10° Brix solution containing high fructose corn syrup (HFCS, ISOSWEET™ 100, available from Staley Manufacturing Co. of Illinois), 0.1% (w/v) potassium sorbate, 0.1% (w/v) sodium benzoate, and 0.1M citric acid (available from Sigma Chemical Co., of St. Louis, Mo.) was prepared. Solutions were separated into separate containers and colored each with 15 mg monomeric anthocyanin per 100 mL of (1) radish anthocyanin extract (RAE), extracted using C-18 resin and organic solvents, (2) radish juice concentrate (RJ), (3) potato anthocyanin extract (POT), extracted using C-18 resin and organic solvents, and (4) potato juice concentrate (PJ) syrup, in duplicates. Potassium sorbate and sodium benzoate were added as needed to restore the 0.1% (w/v) level. The pH of the syrup was adjusted to a pH of about 3.5 with potassium hydroxide. Colored solutions (15 mL) were placed in 20 mL glass vials, flushed with $N_2$, capped and pasteurized in water at about 85° C. for about 25 min. The vials were stored in the dark, at about 2° C. and about 25° for about 65 weeks.

Determination of pH and °Brix

For pH measurements a Brinkman 605 pH-meter (Methrohm Herisan, Switzerland) was used. The instrument was calibrated using buffers of pH 4.0 and 7.0 and the pH was directly measured in all samples. Degree Brix was measured using an Auto Abbe refractometer 10500 (Reichert-Jung, Leica Inc., NY, USA). The instrument was set to measure percent soluble solids in a temperature compensated mode.

Monomeric Anthocyanin Content, Polymeric Color and Color Density

Monomeric anthocyanin content and polymeric color were determined using the well known pH differential method and bisulfite bleaching method, respectively. A Shimadzu 300 UV spectrophotometer and 1 cm pathlength disposable cells were used for spectral measurements at 420, 510 and 700 nm. Pigment content was calculated as pelargonidin-3-glucoside, using an extinction coefficient of 31, 600 L/cm mol and a molecular weight of 433.2g/mol.

Color Measurements

Color characteristics (Hunter CIE LCh) were measured using a ColorQuest colorimeter (HunterLab, Hunter Associates Laboratories Inc., Reston, Va.). The equipment was set for transmittance with (the specular included) Illuminant C and a 10° observer angle. Samples of colored syrup were placed in a 1 cm pathlength optical glass cell (Hellma, Germany) and color parameters were measured (See Table 1 above).

Results of the Potato Juice Colorant Compositions

In addition to measurement of the colorant compositions' color parameters, the affect of storage on the compositions was studied. Color and pigment degradation appeared to depend upon the storage temperature. At room temperature (about 25° C.) the potato juice colorant compositions had anthocyanin half-lives of 10–11 weeks, while refrigerated temperatures (about 4° C.) increased the half-life anthocyanin pigments to over a year. The visual appearance of the potato colorant compositions (at 15 mg/100 mL) were very close to that of FD&C Red No. 40, i.e., about 150 ppm at a pH value of about 3.5.

The color attributes of the potato colorant compositions showed an increase in lightness (L*) and hue angle values during storage. The chroma (color intensity) of the potato colorant compositions decreased during storage. The potato colorant compositions showed increased levels of yellowness. At room temperature (about 25° C.), the color of potato colorant compositions changed from a red color to an orange/red color during the first 10 weeks (giving a color comparable to FD&C Red No. 40). After 20–25 weeks, the potato colorant compositions had a light orange/yellow color. Refrigeration appeared to reduce the color changes of the colorant compositions. Increasing the pigment concentration of the colorant compositions results in increased anthocyanin pigment and color stability and produces colorant compositions having color characteristics even closer to those of FD&C Red No. 40. At the anthocyanin levels present in these example potato colorant compositions (see Table 2) acceptable color characteristics were obtained for up to about 15 weeks at about 25° C.

TABLE 2

Potato Colorant Compositions

|  | (NDOP5847-1) Red-Fleshed Potato |
|---|---|
| Potato yield in U.S. (MT/Ha) | 36 |
| Estimated Pigment Yield (Kg/Ha) | 14.5 |
| Red-fleshed potato Anthocyanin Content (mg anthocyanin/100 g root) | 42 |
| % Recovery of Juice Extract | >80% |

TABLE 2-continued

Potato Colorant Compositions

|  | (NDOP5847-1) Red-Fleshed Potato |
|---|---|
| Filtered Potato Colorant (prior to concentration) | |
| °Brix | 1.6 |
| pH | 2.5 |
| Monomeric anthocyanin (mg/100 mL) | 1.4 |
| % Polymeric color | 18 |
| Potato Colorant Composition (concentrated) | |
| °Brix | 37 |
| pH | 2.4 |
| Monomeric anthocyanin (mg/100 mL) | 250 |
| % Polymeric color | 25 |

Whereas the invention has been described with reference to particular colorant compositions and methods for making the same, it will be understood that the invention is not limited to such exact colorant compositions and methods. On the contrary, the invention is intended to encompass all modifications, alternatives, and equivalents as may be included within the spirit and scope of the invention as defined by the appended claims.

What is claimed is:

1. A method for producing a natural, potato anthocyanin, red-hue colorant, comprising:

obtaining juice removed from a potato, the juice being of a particular pH value;

adjusting the pH value of the juice to precipitate alkaloids in the juice to obtain a supernatant being of about pH 7.6 to about 9.5; and adjusting the pH value of the supernatant such that the supernatant possesses a red-hue.

2. The method of claim 1, wherein the pH value of the juice is adjusted to be from about 7.6 to about 9.0.

3. The method of claim 1, wherein the pH value of the juice is adjusted to be about 8.

4. The method of claim 1, wherein the pH value of the supernatant is adjusted to be from about 1 to about 4.

5. The method of claim 1, wherein the pH value of the supernatant is adjusted to be about 3.5.

6. A method for producing a natural, potato anthocyanin, red-hue colorant, comprising:

pressing potato pieces to remove juice from the potato pieces;

adjusting a pH value of the juice to be from about 7.6 to about 9.0;

filtering the pH adjusted juice to obtain a supernatant that is substantially free of alkaloids;

concentrating the supernatant to obtain a concentrate being of a particular pH value; and adjusting the pH value of the concentrate to obtain a natural colorant having a red-hue equivalent to a red hue of FD&C Red Number 40.

7. The method of claim 6, wherein the pH value of the juice is adjusted to be about 8.0.

8. The method of claim 6, wherein the pH value of the concentrate is adjusted to be from about 1 to about 4.

9. The method of claim 6, wherein the pH value of the concentrate is adjusted to be about 3.5.

10. The method of claim 6, further including immersing the potato pieces in acidified water to substantially inactivate polyphenoloxidase in the potatoes.

11. The method of claim 10, wherein the acidified water is of a pH value equal to or less than about 3.5.

12. The method of claim 10, wherein the pH value of the juice is adjusted using potassium hydroxide.

13. A natural, red-hue colorant comprising an anthocyanin extract from red potatoes, wherein the red hue of the colorant is equivalent to a red hue of FD&C Red Number 40.

14. The natural, red-hue colorant of claim 13, wherein the colorant has an alkaloid content of less than about 5 mg/100 mL of colorant.

15. The natural, red-hue colorant of claim 13, wherein the colorant does not contain organic solvent residuals.

16. The natural, red-hue colorant of claim 13, wherein the colorant has a pH value equal to about 3.0.

17. A natural, red-hue colorant comprising:
anthocyanin extract from red-fleshed potatoes;
phenolic acid;
sugar; and
wherein the red-hue of the colorant is equivalent to a red-hue of FD&C Red No. 40 and the colorant has a pH value of less than about 3.5.

18. The red-hue colorant of claim 17, wherein the colorant includes less than about 5 mg alkaloids per 100 mL colorant.

19. The red-hue colorant of claim 17, wherein the anthocyanin concentration is equal to about 250 mg anthocyanin per 100 mL colorant.

20. A natural, red-hue colorant consisting essentially of anthocyanin extract from red-fleshed potatoes, phenolics, and sugar, wherein the red-hue of the colorant is equivalent to a red-hue of FD&C Red No. 40.

* * * * *